(12) United States Patent
Farley et al.

(10) Patent No.: US 10,820,516 B2
(45) Date of Patent: Nov. 3, 2020

(54) SYSTEM AND METHOD FOR MONITORING THE AMOUNT OF PLANT MATERIALS ENTERING AN AGRICULTURAL HARVESTER

(71) Applicant: CNH Industrial America LLC, New Holland, PA (US)

(72) Inventors: Herbert M. Farley, Elizabethtown, PA (US); Benjamin D. Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 284 days.

(21) Appl. No.: 15/973,670

(22) Filed: May 8, 2018

(65) Prior Publication Data
US 2019/0343048 A1 Nov. 14, 2019

(51) Int. Cl.
*A01D 41/127* (2006.01)
*A01D 41/14* (2006.01)
(Continued)

(52) U.S. Cl.
CPC .......... *A01D 61/02* (2013.01); *A01D 41/127* (2013.01); *A01D 41/141* (2013.01);
(Continued)

(58) Field of Classification Search
CPC .... A01D 45/021; A01D 61/02; A01D 61/002; A01D 41/127; A01D 41/141;
(Continued)

(56) References Cited

U.S. PATENT DOCUMENTS 3,924,729 A * 12/1975 Flinth .................. G01G 11/003
 177/16
4,463,816 A 8/1984 MacFarlane
(Continued)

FOREIGN PATENT DOCUMENTS

DE 20308141 7/2003
EP 3095314 A1 11/2016
(Continued)

OTHER PUBLICATIONS

Extended European Search Report for EP Application No. 19173083.7 dated Sep. 5, 2019 (six pages).

*Primary Examiner* — Robert E Pezzuto
(74) *Attorney, Agent, or Firm* — Peter Zacharias; Patrick Sheldrake

(57) ABSTRACT

In one aspect, an agricultural harvester may include a harvesting implement having a belt support assembly configured to support a conveyor belt of the harvesting implement as the conveyor belt moves relative to the belt support assembly. The system may also include a sensor provided in operative association the belt support assembly, with the sensor being configured to detect a parameter indicative of a force exerted on the belt support assembly as the conveyor belt moves relative to the belt support assembly. Furthermore, the system may include a controller communicatively coupled to the sensor, with the controller being configured to monitor the amount of the plant materials entering the harvester based on measurement signals received from the sensor.

20 Claims, 7 Drawing Sheets

(51) Int. Cl.
*A01D 61/02* (2006.01)
*A01D 61/00* (2006.01)
*A01D 34/04* (2006.01)
*A01D 34/14* (2006.01)
*A01D 69/03* (2006.01)

(52) U.S. Cl.
CPC ............ *A01D 61/002* (2013.01); *A01D 34/04* (2013.01); *A01D 34/14* (2013.01); *A01D 69/03* (2013.01)

(58) Field of Classification Search
CPC .. A01D 41/1271; A01D 57/20; A01D 34/008; A01D 34/14; A01D 79/005; A01D 75/00; A01D 34/04; A01D 69/03; G01G 11/003; G01G 11/04
USPC ........... 56/10.2 A, 10.2 R, 16.4 R, 181, 207; 177/16
See application file for complete search history.

(56) References Cited

U.S. PATENT DOCUMENTS

| | | | |
|---|---|---|---|
| 5,285,019 | A | 2/1994 | Kempf et al. |
| 7,750,253 | B2 | 7/2010 | Wineland |
| 8,495,855 | B1 * | 7/2013 | Conrad ................ A01D 61/002 56/181 |
| 9,578,808 | B2 * | 2/2017 | Dybro .................... A01D 75/00 |
| 9,668,406 | B2 | 6/2017 | Dybro |
| 2007/0144791 | A1 | 6/2007 | Wolfschaffner |
| 2015/0327440 | A1 | 11/2015 | Dybro et al. |
| 2016/0338263 | A1 * | 11/2016 | Dybro ................. A01D 41/127 |

FOREIGN PATENT DOCUMENTS

| | | |
|---|---|---|
| GB | 2086593 | 5/1982 |
| WO | WO201793742 | 6/2017 |

* cited by examiner

SYSTEM AND METHOD FOR MONITORING THE AMOUNT OF PLANT MATERIALS ENTERING AN AGRICULTURAL HARVESTER

FIELD

The present disclosure generally relates to agricultural harvesters and, more particularly, to systems and methods for monitoring the amount of plant materials entering or being ingested by an agricultural harvester as the harvester is moved across a field.

BACKGROUND

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects plant materials from the field. The harvester also includes a plant processing system, which performs various processing operations (e.g., threshing, separating, etc.) to separate the crops from the other plant materials received from the harvesting implement. Furthermore, the harvester includes a crop tank, which receives and stores the crop materials after processing.

The amount of plant materials entering the harvester may impact the efficiency of one or more of the processing operations. For instance, inefficient threshing, high crop losses, and/or rotor slugging may occur when one or more operating parameters of the harvester remain constant after the amount of plant materials being ingested by the harvester changes. As such, it may be desirable adjust the operating parameter(s) of the harvester based on the amount of plant materials being ingested thereby. Current harvesters rely on measurements of the amount of crop materials entering the crop tank to make such adjustments. However, in certain instances, the amount of crop materials entering the crop tank may not be indicative of the actual amount of plant materials (including both crop materials and other plant materials) entering the harvesting implement.

Accordingly, an improved system and method for monitoring the amount of plant materials entering an agricultural harvester would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to an agricultural harvester including a harvesting implement configured to ingest a quantity of plant materials from a field. The harvesting implement may include a frame, a conveyor belt configured to transport the quantity of plant materials through a portion of the harvesting implement, and a plurality of rollers configured to rotatably support the conveyor belt relative to the frame. The harvesting implement may also include a belt support assembly coupled to the frame between an adjacent pair of rollers of the plurality of rollers. The belt support assembly may be configured to support the conveyor belt as the conveyor belt moves relative to the belt support assembly. The agricultural harvester may also include a sensor provided in operative association the belt support assembly, with the sensor being configured to detect a parameter indicative of a force exerted on the belt support assembly as the conveyor belt moves relative to the belt support assembly. Furthermore, the agricultural harvester may include a controller communicatively coupled to the sensor, with the controller being configured to monitor the amount of the plant materials entering the harvester based on measurement signals received from the sensor.

In another aspect, the present subject matter is directed to a system for monitoring an amount of plant materials entering an agricultural harvester. The system may include a harvesting implement configured to ingest a quantity of plant materials from a field. The harvesting implement may include a frame, a conveyor belt configured to transport the quantity of plant materials through a portion of the harvesting implement, and a plurality of rollers configured to rotatably support the conveyor belt relative to the frame. The harvesting implement may further include a belt support assembly coupled to the frame between an adjacent pair of rollers of the plurality of rollers, with the belt support assembly being configured to support the conveyor belt as the conveyor belt moves relative to the belt support assembly. The system may also include a sensor provided in operative association the belt support assembly, with the sensor being configured to detect a parameter indicative of a force exerted on the belt support assembly as the conveyor belt moves relative to the belt support assembly. Furthermore, the system may include a controller communicatively coupled to the sensor, with the controller being configured to monitor the amount of the plant materials entering the harvester based on measurement signals received from the sensor, In a further aspect, the present subject matter is directed to a method for monitoring an amount of plant materials entering an agricultural harvester. The agricultural harvester may include a harvesting implement, with the harvesting implement including a conveyor belt and a belt support assembly configured to support the conveyor belt as the conveyor belt moves relative to the belt support assembly. The method may include controlling, with a computing device, an operation of the agricultural harvester such that the harvesting implement ingests a quantity of plant materials from a field. The method may also include monitoring, with the computing device, an amount of the plant materials being ingested by the harvesting implement based on data received from a sensor provided in operative association with the belt support assembly. Furthermore, the method may include adjusting, with the computing device, an operating parameter of the harvester based on the monitored amount of the plant materials being ingested by the harvester.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
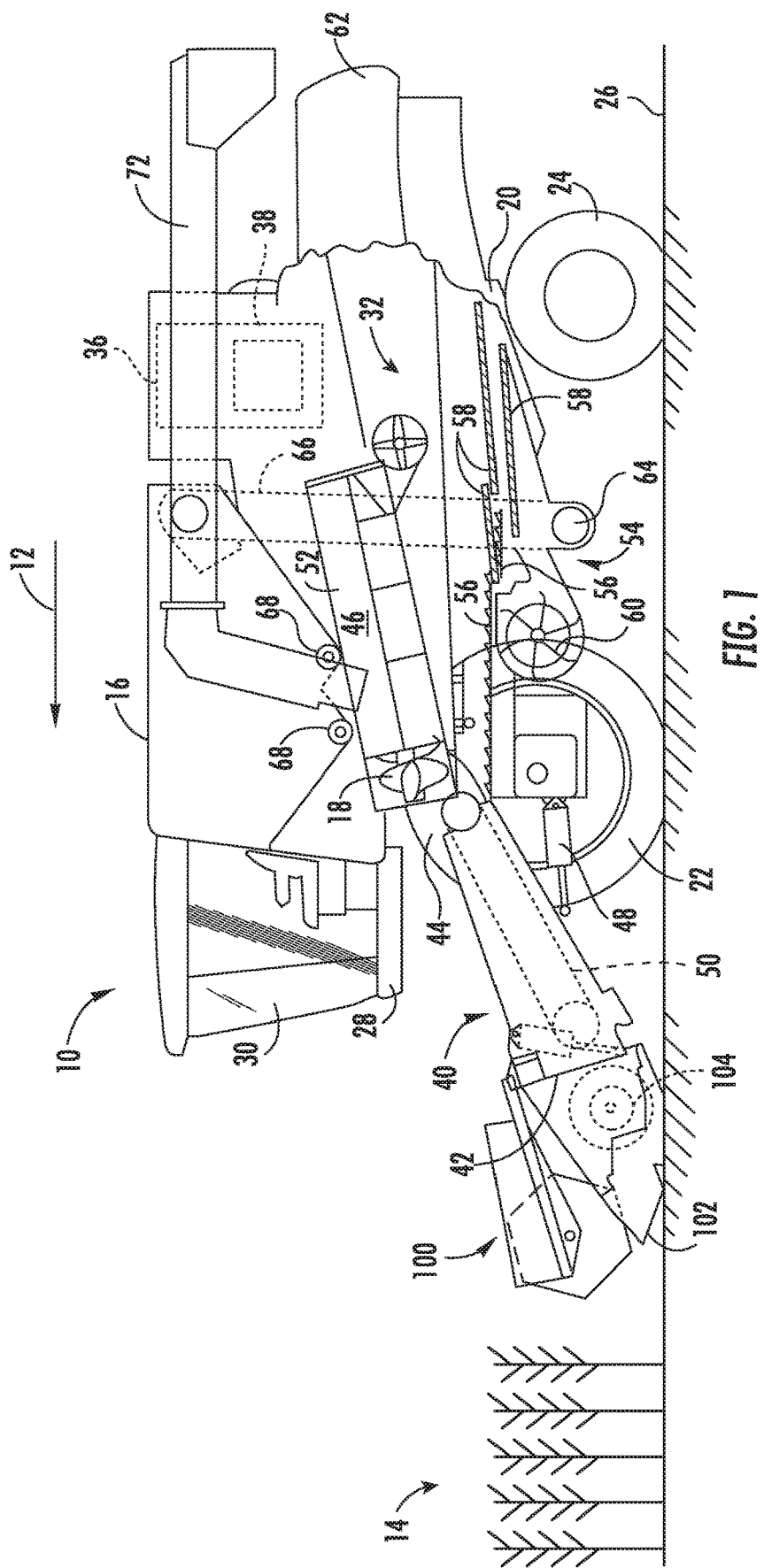
FIG. 1 illustrates a side view of one embodiment of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the amount of plant materials entering or otherwise being ingested by an agricultural harvester. Specifically, in several embodiments, a controller of the disclosed system may be configured to receive measurement signals from a sensor provided in operative association with a belt support assembly of a harvesting implement of the harvester. In general, the belt support assembly may be configured to support a conveyor belt of the harvesting implement as the conveyor belt moves relative to the belt support assembly. In this regard, the sensor may be configured to detect the force exerted on the belt support assembly as the conveyor belt moves relative to the belt support assembly, with such force generally being indicative of the amount of crop materials entering the harvester. As such, the controller may be configured to estimate the amount of plant materials to be ingested and subsequently transferred through the harvester based on the received measurement signals. Thereafter, the controller may further be configured to initiate a control action associated with adjusting an operating parameter of the harvester based on the estimated amount of planted materials to be invested and transferred through the harvester to accommodate such volume of plant materials within the harvester. For instance, in one embodiment, the controller may be configured to adjust the speed at which the harvester is moved across the field and/or the height of the harvesting implement relative to the ground.

Referring now to the drawings, FIG. 1 illustrates a partial sectional side view of one embodiment of an agricultural harvester 10 in accordance with aspects of the present subject matter. In general, the harvester 10 may be configured to be moved across a field in a direction of travel (e.g., as indicated by arrow 12) to harvest standing crop 14. While traversing the field, the harvester 10 may be configured to intake and process harvested plant materials from the standing crop 14, thereby separating the crop materials of the harvested plant materials from the associated residue. Thereafter, the harvester 10 may be configured to store the crop materials within a crop tank 16 of the harvester 10 and discharge the remaining residue from the harvester 10. Furthermore, the harvester 10 may be configured to unload the crop materials stored within the crop tank 16 into a crop cart (not shown) or other suitable crop container.

As shown, in one embodiment, the harvester 10 may be configured as an axial-flow type combine, wherein the harvested plant materials are threshed and separated while being advanced by and along a longitudinally arranged rotor 18. However, it should be appreciated that, in alternative embodiments, the harvester 10 may have any suitable harvester configuration.

The harvester 10 may include a chassis or main frame 20 configured to support and/or couple to various components of the harvester 10. For example, in several embodiments, the harvester 10 may include a pair of driven, ground-engaging front wheels 22 and a pair of steerable rear wheels 24 that are coupled to the frame 20. As such, the wheels 22, 24 may be configured to support the harvester 10 relative to a. ground surface 26 and move the harvester 10 in the forward direction of travel 12 relative to the ground surface 26. Furthermore, the harvester 10 may include an operator's platform 28 having an operator's cab 30, a plant processing system 32, and the crop tank 16 that are supported by the frame 20. As will be described below, the plant processing system 32 may be configured to perform various processing operations on the harvested plant materials as the plant processing system 32 operates to transfer the harvested plant materials received from a harvesting implement (e.g., header 100) of the harvester 10 through the harvester 10. Additionally, as is generally understood, the harvester 10 may include an engine 36 and a transmission 38 mounted on the frame 20. The transmission 38 may be operably coupled to the engine 36 and may provide variably adjusted gear ratios for transferring engine power to the wheels 22, 24 via a drive axle assembly (or via axles if multiple drive axles are employed).

Figure 2:
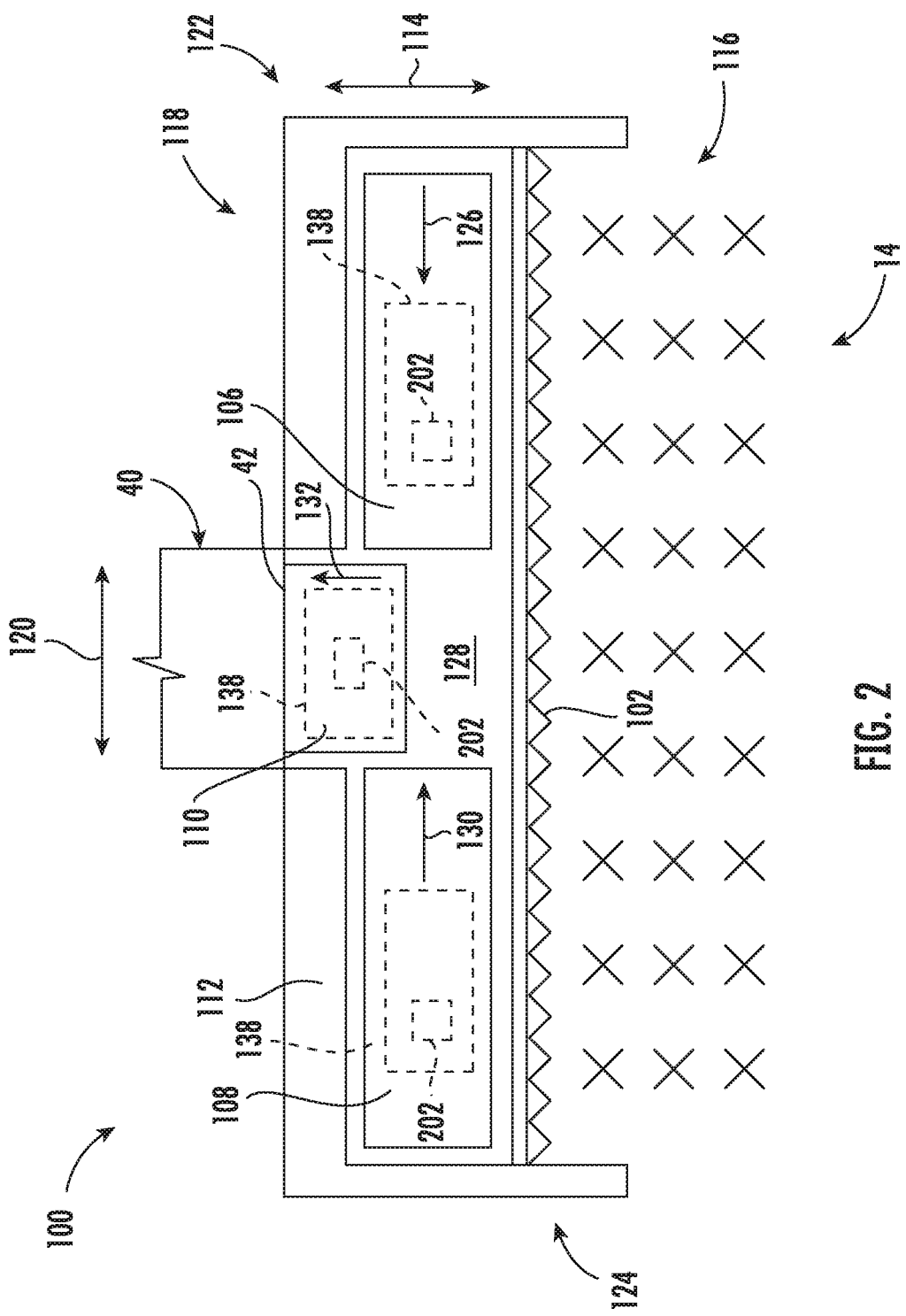
FIG. 2 illustrates a top view of one embodiment of a harvesting implement of an agricultural harvester in accordance with aspects of the present subject matter.

Moreover, as shown in FIG. 2, the header 100 and an associated feeder 40 of the plant processing system 32 may extend forward of the frame 20 and may be pivotally secured thereto for generally vertical movement. In general, the feeder 40 may be configured to serve as support structure for the header 100. As shown in FIG. 2, the feeder 40 may extend between a front end 42 coupled to the header 100 and a rear end 44 positioned adjacent to a threshing and separating assembly 46 of the plant processing system 32. As is generally understood, the rear end 44 of the feeder 40 may be pivotally coupled to a portion of the harvester 10 to allow the front end 42 of the feeder 40 and, thus, the header 100 to be moved upward and downward relative to the ground 26 to set the desired harvesting or cutting height for the header 100. For example, as shown, in one embodiment, the harvester 10 may include a header actuator 48 configured to adjust the height of the header 100 relative to the ground 26. As such, the header actuator 48 may correspond to a fluid-driven actuator, such as a hydraulic or pneumatic cylinder, an electric linear actuator, or any other type of suitable actuator.

As the harvester 10 is propelled forwardly over the field with the standing crop 14, the plant materials are severed from the stubble by a sickle bar 102 at the front of the header 100 and delivered by a header auger 104 to the front end 42 of the feeder 40. A feeder conveyor 50 transports the harvested plant materials from the front end 42 of the feeder 40 to the threshing and separating assembly 46. As is generally understood, the threshing and separating assembly 46 may include a cylindrical chamber 52 in which the rotor 18 is rotated to thresh and separate the harvested plant materials received therein. That is, the harvested plant materials are rubbed and beaten between the rotor 18 and the inner surfaces of the chamber 52, whereby the crop materials (e.g., grain, seed, or the like) are is loosened and separated from the straw of the plant materials.

The crop materials that have been separated by the threshing and separating assembly 46 may fall onto a crop cleaning assembly 54 of the plant processing system 32. In general, the crop cleaning assembly 54 may include a series of pans 56 and associated sieves 58. As is generally understood, the separated crop materials may be spread out via oscillation of the pans 56 and/or the sieves 58 and may eventually fall through apertures defined in the sieves 58. Additionally, a cleaning fan 60 may be positioned adjacent to one or more of the sieves 58 to provide an air flow through the sieves 58 that remove chaff and other impurities from the crop materials. For instance, the fan 60 may blow the impurities off of the crop materials for discharge from the harvester 10 through the outlet of a straw hood 62 positioned at the back end of the harvester 10. The cleaned crop materials passing through the sieves 58 may then fall into a trough of an auger 64, which may be configured to transfer the crop materials to an elevator 66 for delivery to the crop tank 18. Additionally, in one embodiment, a pair of tank augers 68 at the bottom of the crop tank 18 may be used to urge the cleaned crop materials sideways to an unloading tube 72 for discharge from the harvester 10.

Figure 3:
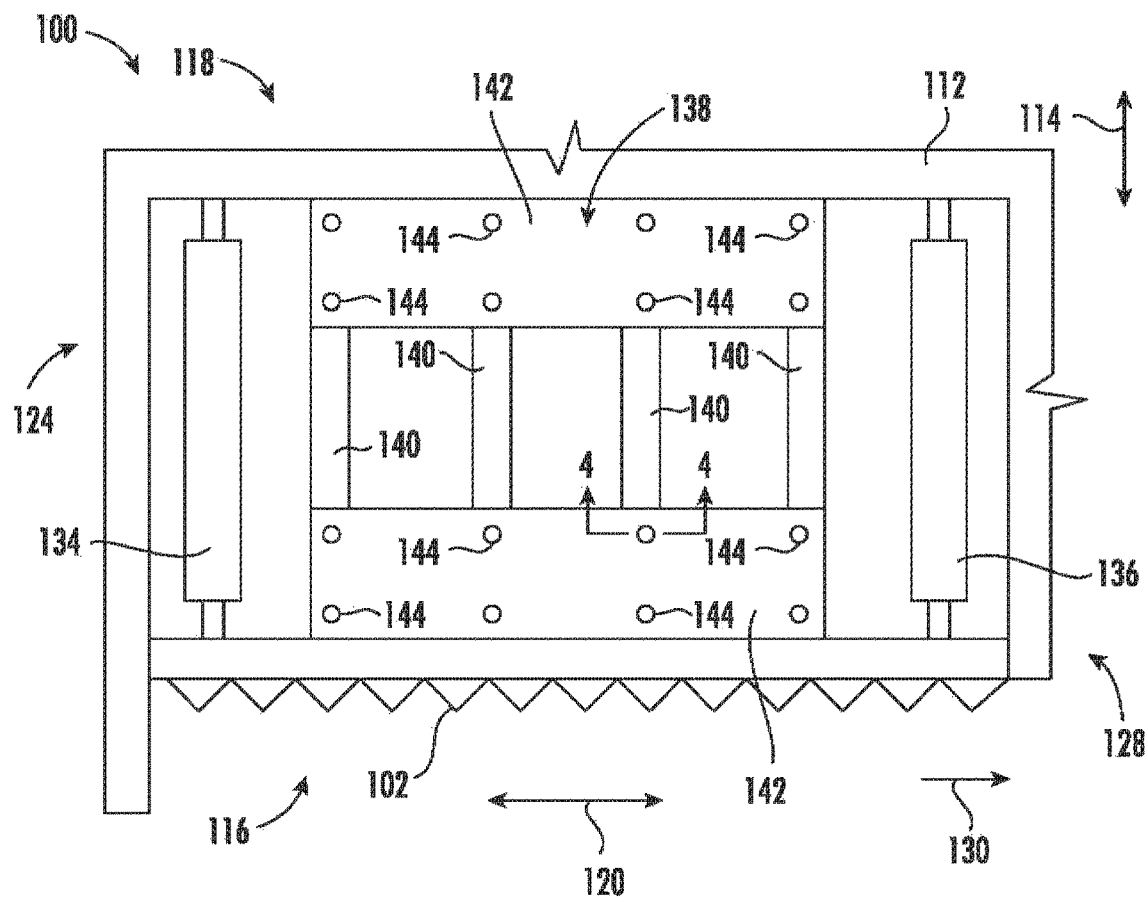
FIG. 3 illustrates a top view of a portion of the harvesting implement shown in FIG. 2, particularly illustrating one embodiment of a belt support assembly of the harvesting implement in accordance with aspects of the present subject matter.

FIGS. 2 and 3 illustrate differing top views of one embodiment of the header 100 described above with reference to FIG. 1 in accordance with aspects of the present subject matter. Specifically, FIG. 2 illustrates a top view of the header 100, particularly illustrating several conveyors belts 106, 108, 110 of the header 100. Additionally, FIG. 3 illustrates partial top view of one side of the header 100 with the conveyor belt 108 being removed for purposes of illustration.

As shown in FIG. 2, the header 100 may include a header frame 112. In general, the frame 112 may extend along a longitudinal direction 114 between a forward end 116 and an aft end 118. The frame 112 may also extend along a lateral direction 120 between a first side 122 and a second side 124. In this respect, the frame 112 may be configured to support or couple to a plurality of components of the header 100. For example, the conveyor belts 106, 108, 110 and the header auger 104 (FIG. 1) may be supported by the frame 112. Additionally, the sickle bar 102 may be supported by and/or coupled to the frame 112.

In several embodiments, the header 100 may be configured as a draper header. In such embodiments, the conveyor belts 106, 108, 110 may be configured to transport the harvested plant materials from the sickle bar 102 to the feeder 40. For example, as shown, in one embodiment, laterally extending first and second conveyor belts 106, 108 may be positioned adjacent to the first and second sides 122, 124 of the header frame 112, respectively. In this regard, the first lateral conveyor belt 106 may be configured to transport harvested plant materials laterally inward (e.g., as indicated by arrow 126 in FIG. 2) from the first side 122 of the frame 112 toward a laterally central portion 128 of the header 100. Similarly, the second lateral conveyor belt 108 may be configured to transport harvested plant materials laterally inward (e.g., as indicated by arrow 130 in FIG. 2) from the second side 124 of the frame 112 toward the laterally central portion 128. Additionally, a central conveyor belt 110 may be positioned laterally between the conveyor belts 106, 108 such that the conveyor belt 110 is positioned at or proximate to the laterally central portion 128 of the header 100. As such, the central conveyor belt 110 may be configured to transport the plant materials provided to the laterally central portion 128 of the header 100 by the lateral conveyor belts 106, 108 to the front end 42 of the feeder 40 (e.g., as indicated by arrow 132 in FIG. 2). As will be described in greater detail below, each conveyer belt 106, 108, 110 may be provided in operative association with one or more belt support assemblies 138 and each belt support assembly 138 may include a sensor 202 provided in operative association therewith. Each sensor 202 may, in turn, be configured to detect a parameter indicative of the force exerted on the corresponding belt support assembly 138 as the respective conveyor belt 106, 108, 110 moves relative to the corresponding belt support assembly 138. It should be appreciated that, alternative embodiments, the header 100 may include any other suitable number of conveyor belts, such as more or fewer than three conveyor belts. Furthermore, it should be appreciated that the header 100 may be configured as any other suitable type of header.

As indicated above, the conveyor belts 106, 108, 110 may be supported by the header frame 112. Specifically, in several embodiments, the header 100 may include a pair of rollers configured to rotatably support each conveyor belt relative to the header frame 112. For example, in the example, partial view shown in FIG. 3, a laterally outer roller 134 may be rotatably coupled to the frame 112 adjacent to its second end 124, while a laterally inner roller 136 may be rotatably coupled to the frame 112 adjacent to the laterally central portion 128. As such, the second lateral conveyor belt 108 may be configured to be wrapped around or otherwise engage the rollers 134, 136 such that the direction of travel of the conveyor belt 108 changes (e.g., reverses direction) as the conveyor belt 108 engages or wraps around each roller 134, 136. Furthermore, at least one of the rollers 134, 136 may be configured to rotationally drive the associated conveyor belt 108 such that the harvested plant materials are moved in the corresponding conveyance direction 130. It should be appreciated that, in one embodiments, the header 100 may include additional rollers positioned between the rollers 134, 136 to support portions of the conveyor belt 108 extending between the rollers 134, 136.

Moreover, the header 100 may also include a belt support assembly associated with each conveyor belt to support the belt along its length defined between its associated rollers. For example, as shown in FIG. 3, a belt support assembly 138 may be configured to support the portion of the conveyor belt 108 extending between the rollers 134, 136. Specifically, in several embodiments, the belt support assembly 138 may be coupled (e.g., fixedly coupled) to the header frame 112, such as between the rollers 134, 136. As such, the belt support assembly 138 may be configured to support the conveyor belt 108 as the conveyor belt 108 moves or slides relative to the top of the belt support assembly 138 in the conveyance direction 130. For example, as shown in FIG. 3, in one embodiment, the belt support assembly 138 may include a plurality of laterally spaced support members 140, with each support member 140 being coupled to and extending longitudinally between the forward and aft ends 116, 118 of the frame 112. Furthermore, the belt support assembly 138 may include a pair of longitudinally spaced apart support plates 142, with each support plate 142 being coupled to and supported by the support members 140. As such, the support members 140 generally extend along the longitudinal direction 114, while the support plates 142 generally extend along the lateral direction 120. Additionally, the support plates 142 may be positioned on top of and coupled to the support members 140 by a plurality of fasteners 144, such as bolts, screws, rivets, and/or the like. It should be appreciated that the belt support assembly 138 may include any suitable number of support members 140 and/or support plates 142. Furthermore, it should be appreciated that the header 100 may include additional belt support assemblies 138. In such instances, one belt support assembly 138 may be coupled to the frame 112 between each adjacent pair of rollers.

Additionally, it should be appreciated that the other conveyor belts 106, 110 may be configured to be supported relative to the frame 112 in the same or a similar manner as that shown in FIG. 3 with reference to the conveyor belt 108. For example, each conveyor belt 106, 110 may be supported relative to the frame 112. by a respective plurality of rollers (e.g., a pair of opposed end rollers). Moreover, one or more belt support assemblies 138 may be configured to support each conveyor belt 106, 110 between its associated rollers as the respective conveyor belt 106, 110 is moved across such belt support assemblies 138.

Figure 4:
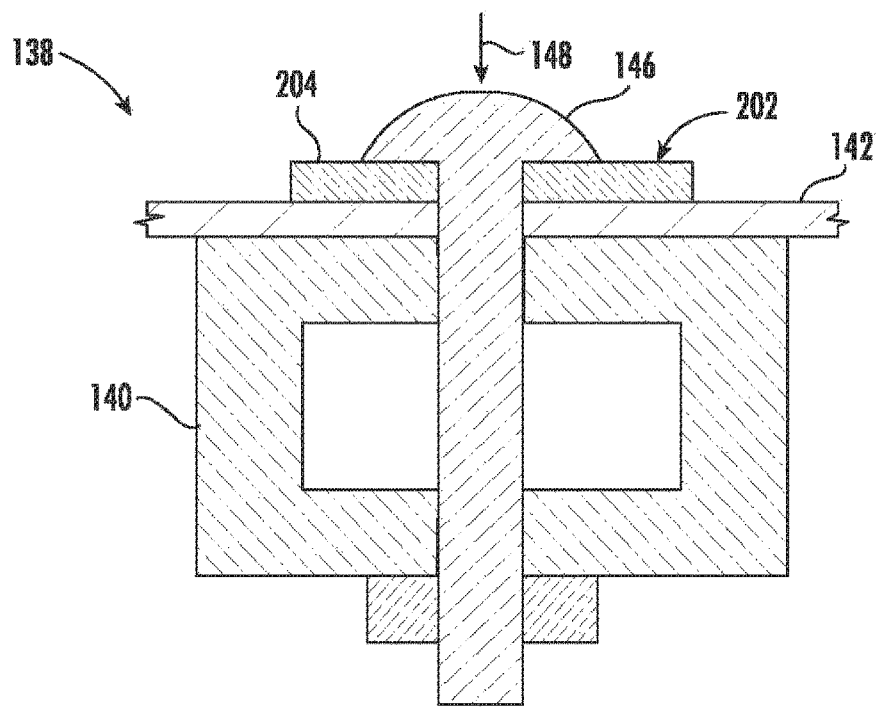
FIG. 4 illustrates a cross-sectional view of a portion of belt support assembly shown in FIG. 3 taken about line 4-4, particularly illustrating one embodiment of a sensor provided in operative association with the belt support assembly in accordance with aspects of the present subject matter.

Referring now to FIG. 4, a cross-sectional view of a portion of the belt support assembly 138 shown in FIG. 3 taken generally about line 4-4 is illustrated in accordance with aspects of the present subject matter. As shown, in several embodiments, a sensor 202 may be provided in operative association with the belt support assembly 138. In general, the sensor 202 may be configured to detect a parameter indicative of the force exerted on the belt support assembly 138 as the conveyor belt 108 moves relative to the belt support assembly 138. Such force may generally be indicative of the amount of plant materials being transported by the conveyor belt 108. For example, in one embodiment, the sensor 202 may be configured as a load washer 204 positioned between one of the fasteners 144 and one of the support plates 142. In such embodiment, when the conveyor belt 108 slides along the support plates 142 (thereby contacting a head 146 of each fastener 144), the weight of the plant materials being transported by the conveyor belt 108 exerts a force (e.g., as indicated by arrow 148 in FIG. 4) on the fasteners 144. Such force 148 compresses the load washer 204 between the corresponding fastener head 146 and the adjacent support plate 142, with the load washer 204 being configured to detect such compression. It should be appreciated that a sensor 202 may be provided in operative association with any one or any combination of the fasteners 144 coupling the support members 140 and support plates 142. Furthermore, it should be appreciated that one or more additional load washers 204 may be provided in operative association with the belt support assemblies 138 supporting the conveyor belts 106 and/or 110.

Figure 5:
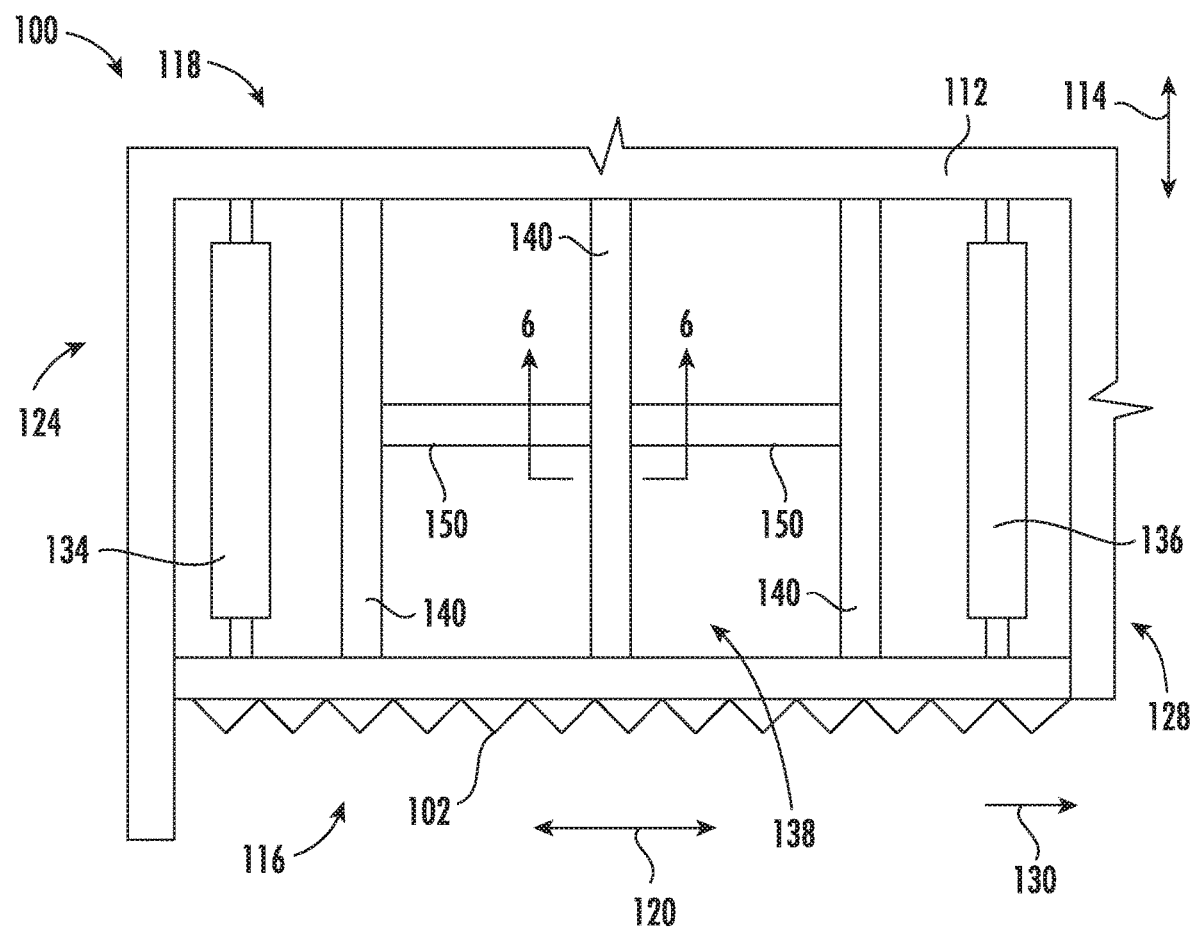
FIG. 5 illustrates a top view of a portion of the harvesting implement shown in FIG. 2, particularly illustrating another embodiment of a belt support assembly of the harvesting implement in accordance with aspects of the present subject matter.
Figure 6:
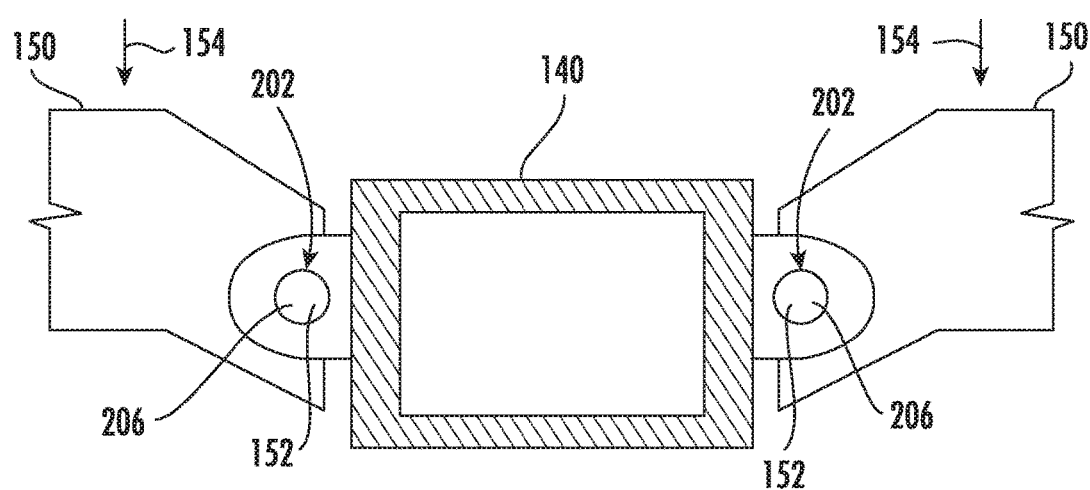
FIG. 6 illustrates a cross-sectional view of a portion of belt support assembly shown in FIG. 5 taken about line 6-6, particularly illustrating another embodiment of a sensor provided in operative association with the belt support assembly in accordance with aspects of the present subject matter.

Referring now to FIGS. 5 and 6, views of another embodiment of the belt support assembly 138 described above with reference to FIGS. 3 and 4 are illustrated in accordance with aspects of the present subject matter. Specifically, FIG. 5 illustrates a top view of the belt support assembly 138 installed on the header 100 with the corresponding lateral conveyor belt 108 removed for purposes of illustration. Additionally, FIG. 6 illustrates a cross-sectional view of a portion of the belt support assembly 138 shown in FIG. 5 taken generally about line 6-6.

As shown, the belt support assembly 138 may generally be configured the same as or similar to that described above with reference to FIGS. 3 and 4. For instance, the belt support assembly 138 may be coupled to the header frame 112 between the rollers 134, 136 and configured to support the conveyor belt 108 as the conveyor belt 108 moves or slides relative to the belt support assembly 138. Furthermore, the belt support assembly 138 may also include a plurality of laterally spaced apart support members 140, with each support member 140 being coupled to and extending longitudinally between the forward and aft ends 116, 118 of the frame 112. However, as shown in FIGS. 5 and 6, unlike the above-described embodiment, the belt support assembly 138 may include a cross member 150 coupled to and extending laterally between each adjacent pair of the support members 140. Specifically, as shown in FIG. 6, each cross member 150 may be coupled to the adjacent support member 140 via a pin 152, such as a load pin 206. It should be appreciated that, in alternate embodiments, the cross members 150 and the support members 140 may be coupled by any other suitable type of connection.

Additionally, like the embodiments shown in FIGS. 3 and 4, a sensor 202 may be provided in operative association with the belt support assembly 138, with the sensor 202 being configured to detect a parameter indicative of the force exerted on the belt support assembly 138 as the conveyor belt 108 moves relative to the belt support assembly 138. For example, in one embodiment, the sensor 202 may be configured as the load pin 206. In such embodiment, when the conveyor belt 108 slides along the cross members 150, the weight of the plant materials being transported by the conveyor belt 108 exerts a force (e.g., as indicated by arrow 154 in FIG. 6) on the cross members 150. The load pin 206 may, in turn, be configured to detect such forces 154 (e.g., via the shear loads exerted on the load pin 206 thereby). It should be appreciated that a load pin 206 may be provided in operative association with the connection between any one of the support members 140 and any one of the cross members 150. Furthermore, it should be appreciated that one or more additional load pins 206 may be provided in operative association with the belt support assemblies 138 supporting the conveyor belts 106 and/or 110.

Figure 7:
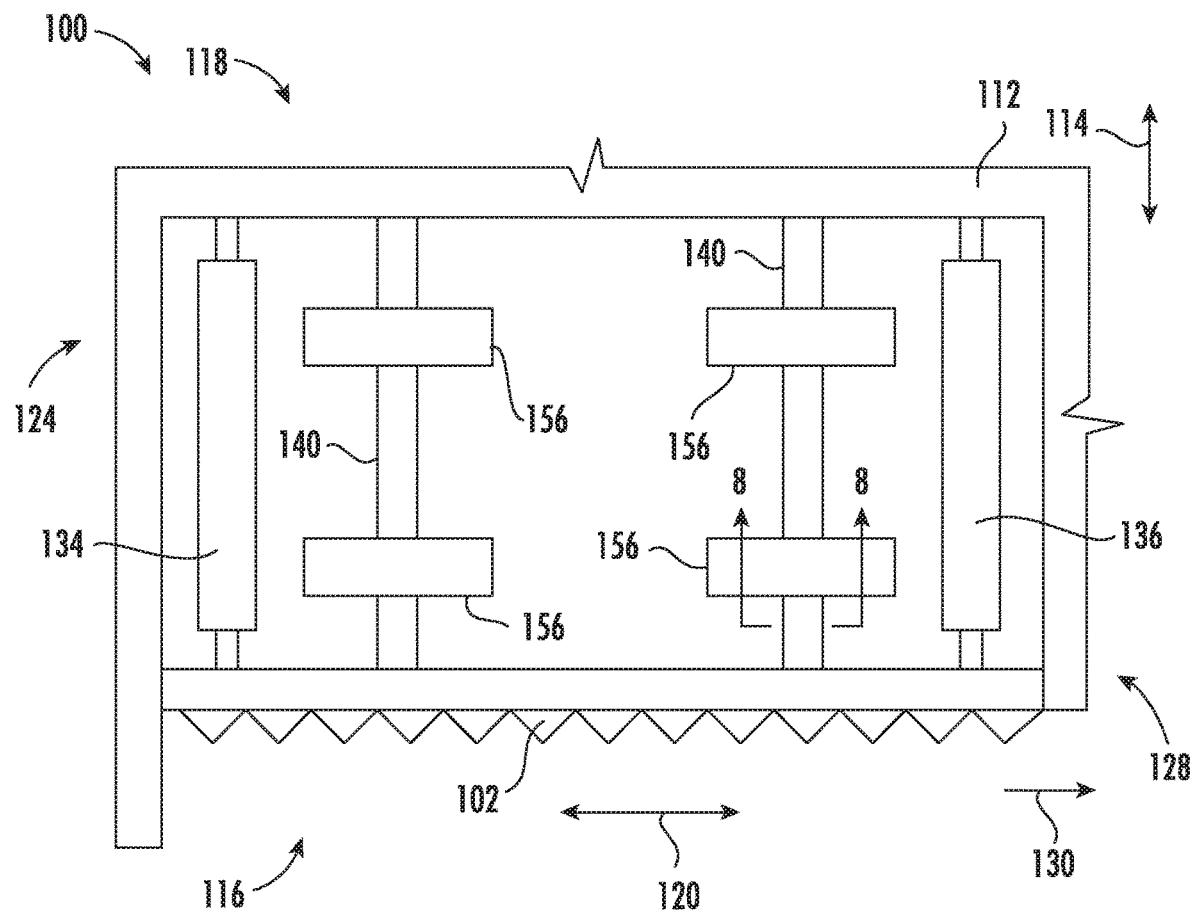
FIG. 7 illustrates a top view of a portion of the harvesting implement shown in FIG. 2, particularly illustrating a further embodiment of a belt support assembly of the harvesting implement in accordance with aspects of the present subject matter.
Figure 8:
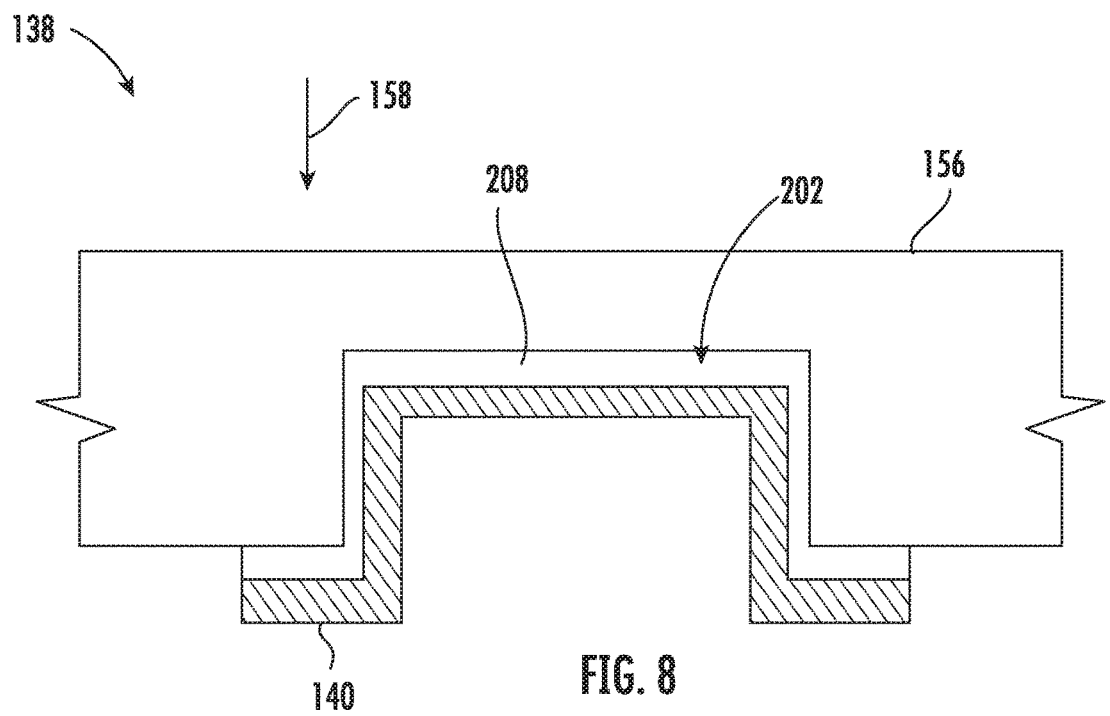
FIG. 8 illustrates a cross-sectional view of a portion of belt support assembly shown in FIG. 7 taken about line 8-8, particularly illustrating a further embodiment of a sensor provided in operative association with the belt support assembly in accordance with aspects of the present subject matter.

Referring now to FIGS. 7 and 8, views of a further embodiment of the belt support assembly 138 described above with reference to FIGS. 3 through 6 is illustrated in accordance with aspects of the present subject matter. Specifically, FIG. 7 illustrates a top view of the belt support assembly 138 installed on the header 100 with the corresponding lateral conveyor belt 108 removed for purposes of illustration. Additionally, FIG. 8 illustrates a cross-sectional view of a portion of the belt support assembly 138 shown in FIG. 7 taken generally about line 8-8.

As shown, the belt support assembly 138 may generally be configured the same as or similar to that described above with reference to FIGS. 3 through 6. For instance, the belt support assembly 138 may be coupled to the header frame 112 between the rollers 134, 136 and configured to support the conveyor belt 108 as the conveyor belt 108 moves or slides relative to the belt support assembly 138, Furthermore, the belt support assembly 138 may also include a plurality of laterally spaced apart support members 140, with each support member 140 being coupled to and extending longitudinally between the forward and aft ends 116, 118 of the frame 112. However, as shown in FIGS. 7 and 8, unlike the above-described embodiments, the belt support assembly 138 may include a plurality of laterally extending support members 156 positioned on top of and coupled to each support member 140. As shown, the support members 156 may generally be oriented perpendicular relative to the support members 140 Furthermore, the ends of each support member 156 may be unsupported (e.g., in a cantilever beam-like manner).

Additionally, similar to the embodiments shown in FIGS. 3 through 6, a sensor 202 may be provided in operative association with the belt support assembly 138, with the sensor 202 being configured to detect a parameter indicative of the force exerted on the belt support assembly 138 as the conveyor belt 108 moves relative to the belt support assembly 138. For example, in one embodiment, the sensor 202 may be configured as a load cell 208 positioned between one of the support members 156 and one of the support members 140. In such embodiment, when the conveyor belt 108 slides along the support members 156, the weight of the plant materials being transported by the conveyor belt 108 exerts a force (e.g., as indicated by arrow 158 in FIG. 8) on the corresponding support member 156. Such force 158 compresses the load cell 208 between the corresponding support members 140, 156, with the load cell 208 being configured to detect such compression. It should be appreciated that a load cell 208 may be provided in operative association with the interface defined between any one of the support members 140 and any one of the support members 156. Furthermore, it should be appreciated that one or more additional load cells 208 may be provided in operative association with the belt support assemblies 138 supporting the conveyor belts 106 and/or 110.

Additionally, it should be appreciated that the sensor 202 may be configured as any other type of sensor capable of detecting a parameter indicative of the force exerted on one of the belt support assemblies 138 as each corresponding conveyor belt 106, 108, 110 moves relative to its adjacent belt support assembly 138. For example, in one embodiment, the sensor 202 may be configured as a strain gauge. Moreover, the sensor 202 may be provided in operative association with any component or combination of components of the belt support assembly 138.

It should be further be appreciated that the configurations of the harvester 10 and the header 100 described above and shown in FIGS. 1 through 8 are provided only to place the present subject matter in an exemplary field of use. Thus, it should be appreciated that the present subject matter may be readily adaptable to any manner of harvester and/or header configuration.

Figure 9:
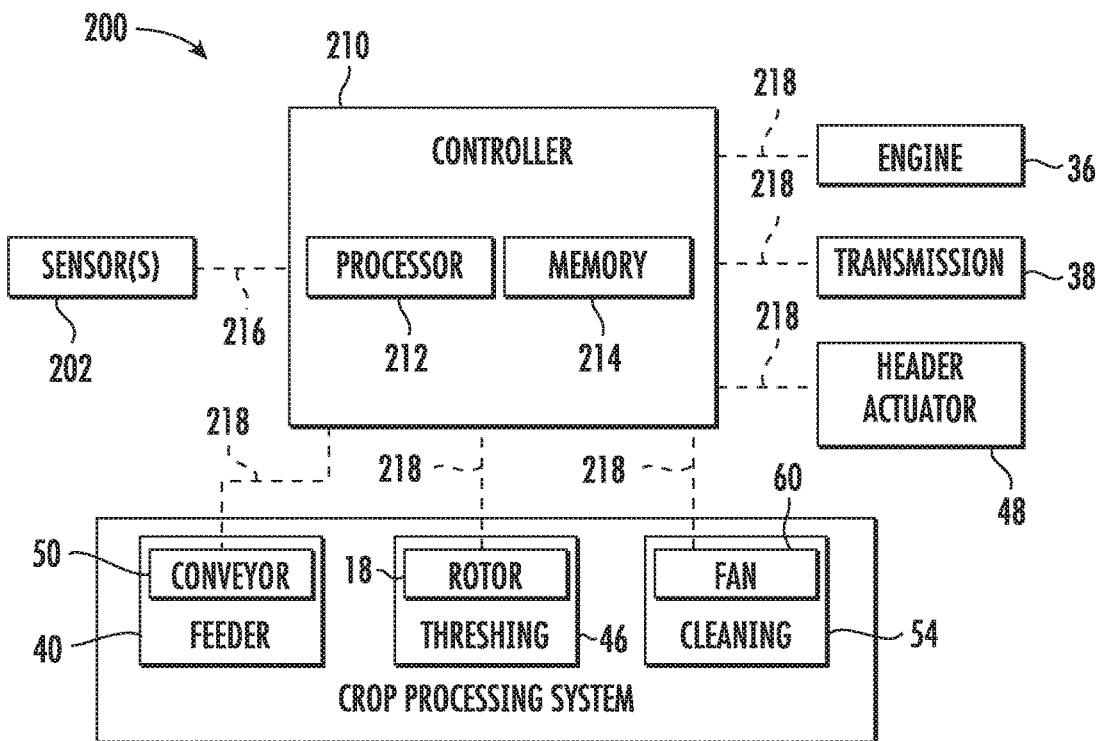
FIG. 9 illustrates a schematic view of one embodiment of a system for monitoring the amount of crop materials entering an agricultural harvester in accordance with aspects of the present subject matter.

Referring now to FIG. 9, a schematic view of one embodiment of a system 200 for monitoring the amount of plant materials entering an agricultural harvester is illustrated in accordance with aspects of the present subject matter. In general, the system 200 will be described herein with reference to the harvester 10 and the header 100 described above with reference to FIG. 1 through 8. However, it should be appreciated by those of ordinary skill in the art that the disclosed system 200 may generally be utilized with harvesters having any other suitable harvester configuration and/or with headers having any other suitable header configuration.

As shown in FIG. 9, the system 200 may include various components of the harvester 10. For example, in several embodiments, the system 200 may include one or more sensors (e.g., one or more of the sensors 202 described above, such as the load washer 204, the load pin 206, and/or the load cell 208. For example, in one embodiment, the system 200 may include one sensor 202 provided in operative association with the belt support assembly 138 of the first lateral conveyor belt 106 and another sensor 202 provided in operative association with the belt support assembly 138 of the second lateral conveyor belt 108. In an alternative embodiment, the system 200 may include one sensor 202 provided in operative association with the belt support assembly 138 of the central conveyor belt 110. However, it should be appreciated that the system 200 may include any other suitable number of sensors 202. Furthermore, the system 200 may include the engine 36, the transmission 38, and/or the header actuator 48 of the harvester 10 described above with reference to FIG. 1. Additionally, the system 200 may include one or more components of the crop processing system 32 described above, such as one or more components of the feeder 40, the threshing and separating assembly 46, and/or the crop cleaning assembly 54. For example, in the embodiment shown in FIG. 9, the system 200 may include the feeder conveyor 50 of the feeder 40, the rotor 18 of the threshing and separating assembly 46, and the fan 60 of the crop cleaning assembly 54. However, it should be appreciated that, in alternative embodiments, the system 200 may include any other suitable components of the harvester 10.

In accordance with aspects of the present subject matter, the system 200 may also include a controller 210 configured to electronically control the operation of one or more components of the harvester 10. In general, the controller 210 may comprise any suitable processor-based device known in the art, such as a computing device or any suitable combination of computing devices. Thus, in several embodiments, the controller 210 may, include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the controller 210 may generally comprise memory element(s) including, but not limited to, a computer readable medium (e.g., random access memory (RAM)), a computer readable non-volatile medium (e.g., flash memory), a floppy disk, a compact disc-read only memory (CD-ROM), a magneto-optical disk (MOD), a digital versatile disc (DVD) and/or other suitable memory elements. Such memory device(s) 214 may generally be configured to store suitable computer-readable instructions that, when implemented by the processor(s) 212, configure the controller 210 to perform various computer-implemented functions, such as one or more aspects of the method 300 described below with reference to FIG. 11. In addition, the controller 210 may also include various other suitable components, such as a communications circuit or module, one or more input/output channels, a data/control bus and/or the like.

It should be appreciated that the controller 210 may correspond to an existing controller of the harvester 10 or the controller 210 may correspond to a separate processing device. For instance, in one embodiment, the controller 210 may form all or part of a separate plug-in module that may be installed within the harvester 10 to allow for the disclosed system and method to be implemented without requiring additional software to be uploaded onto existing control devices of the harvester 10.

In several embodiments, the controller 210 may be configured to monitor the amount of the plant materials entering the harvester 10. Specifically, as shown in FIG. 9, the controller 210 may be communicatively coupled to the sensor(s) 202 via a wired or wireless connection to allow measurement signals (e.g., indicated by dashed line 216 in FIG. 9) to be transmitted from the sensor(s) 202 to the controller 210. For instance, the controller 210 may include a look-up table or suitable mathematical formula stored within its memory 214 that correlates the sensor measurements to the amount of the plant materials entering the harvester 10. Specifically, in one embodiment, the controller 210 may be configured to correlate the force(s) detected by the sensor(s) 202 to a corresponding volume or amount of plant materials being conveyed through the header 100. It should be appreciated that, in embodiments in which the system 200 includes sensors 202 provided in operative association with the belt support assemblies 138 of both of the lateral conveyor belts 106 and 108, the controller 210 may be configured to sum the amounts of plant materials determined based on measurement signals 216 from each sensor 202 to estimate the total amount of plant materials being ingested by the harvester 10.

In one embodiment, the monitored amount of plant materials of may correspond to an instantaneous value of the amount of the plant materials being ingested by the harvester 10. More specifically, as is generally understood, the amount of plant materials produced by the standing crop 14 may vary as the harvester 10 is moved across the field. In such embodiment, the controller 210 may be configured to continuously receive the measurement signals 216 as the harvester 10 is moved through the field. As such, the controller 210 may be configured to continuously update the monitored amount of plant materials based on the subsequently received measurement signals 216.

In accordance with aspects of the present subject matter, the controller 210 may also be configured to initiate a control action associated with adjusting one or more operating parameters of the harvester 10 based on the monitored amount of plant materials. More specifically, as mentioned above, the monitored amount of the plant materials to be ingested by and transferred through the harvester 10 may vary throughout the field. As such, in several embodiments, the controller 210 may be configured to adjust of the one or more of the harvester's operating parameters based on variations in the monitored amount of plant materials over time as the harvester 10 is moved through the field. For example, when the monitored amount of plant materials increases, the controller 210 may be configured to adjust one or more operating parameters in a manner that permits the harvester 10 to intake and process the increased amount of plant materials. Conversely, when the monitored amount of plant materials decreases, the controller 210 may be configured to adjust one or more operating parameters in a manner that permits the harvester 10 to intake and process the decreased amount of the plant materials.

In several embodiments, the controller 210 may be configured to adjust one or more operating parameters associated with a speed of the harvester 10 relative to the field based on the monitored amount of plant materials. Specifically, as shown in FIG. 9, the controller 210 may be communicatively coupled to the transmission 38 of the harvester 10 via a wired or wireless connection to allow control signals (e.g., indicated by dashed lines 218 in FIG. 3) to be transmitted from the controller 210 to the transmission 38. Such control signals 218 may be configured to instruct the transmission to upshift or downshift to change the speed of the harvester 10. For example, when the monitored amount of plant materials increases, the control signals 218 may instruct the transmission 38 to downshift such that the speed of the harvester 10 is decreased. Conversely, when the monitored amount of plant materials decreases, the control signals 218 may instruct the transmission 38 to upshift such that the speed of the harvester 10 is increased. However, it should be appreciated that, in alternative embodiments, the controller 210 may be configured to transmit control signals 218 to any other suitable component of the harvester 10 such that the speed of the harvester 10 is adjusted.

Furthermore, the controller 210 may be configured to adjust one or more operating parameters associated with a power output of the harvester 10. Specifically, as shown in FIG. 9, the controller 210 may be communicatively coupled to the engine 36 of the harvester 10 via a wired or wireless connection to allow the control signals 218 to be transmitted from the controller 210 to the engine 36. Such control signals 218 may be configured to instruct the engine 36 to vary its power output to accommodate the increasing or decreasing amount of the plant materials. For example, when the monitored amount of plant materials increases, the control signals 218 may instruct the engine 36 to increase its power output (e.g., by increasing a fuel flow to the engine 36). Conversely, when the monitored amount of plant materials decreases, the control signals 218 may instruct the engine 36 to decrease its power output (e.g., by reducing the fuel flow to the engine 36). However, it should be appreciated that, in alternative embodiments, the controller 210 may be configured to transmit control signals 218 to any other suitable component of the harvester 10 such that the power output of the harvester 10 is adjusted.

Moreover, the controller 210 may be configured to adjust one or more operating parameters associated with the header 100 based on the monitored amount of plant materials. Specifically, as shown in FIG. 9, the controller 210 may be communicatively coupled to the header actuator 48 via a wired or wireless connection to allow the control signals 218 to be transmitted from the controller 210 to the header actuator 48. Such control signals 218 may be configured to instruct the header actuator 48 to vary the height of the header 100 relative to the ground 26 to adjust the amount of the plant materials being ingested by the header 100. For example, when the monitored amount of plant materials increases, the control signals 218 may instruct the header actuator 48 to raise the header 100 relative to the ground 26 to reduce the amount of plant materials entering the harvester 10. Conversely, when the monitored amount of plant materials decreases, the control signals 218 may instruct the header actuator 48 to lower the header 100 relative to the ground 26 increase the amount of plant materials entering the harvester 10. However, it should be appreciated that, in alternative embodiments, the controller 210 may be configured to transmit control signals 218 to any other suitable component of the header 100 such that one or more operating parameters of the header 100 are adjusted based on the monitored amount of plant materials.

The controller 210 may also be configured to adjust one or more operating parameters of the feeder 40 based on the estimated crop volume value. Specifically, as shown in FIG. 9, the controller 210 may be communicatively coupled to the feeder conveyor 50 (e.g., a motor or shaft controlling the operating speed of the feeder conveyor 50) of the feeder 40 via a wired or wireless connection to allow the control signals 218 to be transmitted from the controller 210 to the feeder conveyor 50. Such control signals 218 may be configured to instruct the feeder conveyor 50 to vary its speed to accommodate the amount of the plant materials being ingested by the header 100. For example, when the monitored amount of plant materials increases, the control signals 218 may instruct the feeder conveyor 50 to increase its speed to deliver the harvested plant materials to the threshing and separating assembly 46 at a faster rate. Conversely, when the monitored amount of plant materials decreases, the control signals 218 may instruct the feeder conveyor 50 to reduce its speed to deliver the harvested plant materials to the threshing and separating assembly 46 at a slower rate. However, it should be appreciated that, in alternative embodiments, the controller 210 may be configured to transmit control signals 218 to any other suitable component of the feeder 40 such that one or more operating parameters of the feeder 40 are adjusted to allow the estimated amount of plant materials to be transferred through the feeder 40.

Additionally, the controller 210 may also be configured to adjust one or more operating parameters of the threshing and separating assembly 46 based on the monitored amount of plant materials. Specifically, as shown in FIG. 9, the controller 210 may be communicatively coupled to a rotational drive source for the rotor 18 of the threshing and separating assembly 46 (e.g., the engine 36 or other actuator) via a wired or wireless connection to allow the control signals 218 to be transmitted from the controller 210 to the rotor 18. Such control signals 218 may be configured to instruct the rotor 18 to vary its speed to accommodate the amount of the plant materials to be transferred through the threshing and separating assembly 46. For example, when the monitored amount of plant materials increases, the control signals 218 may instruct the rotor 18 to increase its speed s to deliver the harvested plant materials to the crop cleaning assembly 54 at a faster rate. Conversely, when the monitored amount of plant materials decreases, the control signals 218 may instruct the rotor 18 to reduce its speed to deliver the harvested plant materials to the crop cleaning assembly 54 at a slower rate. However, it should be appreciated that, in alternative embodiments, the controller 210 may be configured to transmit control signals 218 to any other suitable component of the threshing and separating assembly 46 such that one or more operating parameters of the threshing and separating assembly 46 are adjusted to allow the monitored amount of plant materials to be transferred through the threshing and separating assembly 46.

Furthermore, the controller 210 may be configured to adjust one or more operating parameters of the crop cleaning assembly 54 based on the monitored amount of plant materials. Specifically, as shown in FIG. 9, the controller 210 may be communicatively coupled to the fan 60 (e.g., a motor controlling the fan 60) of the crop cleaning assembly 54 via a wired or wireless connection to allow the control signals 218 to be transmitted from the controller 210 to the fan 60. Such control signals 218 may be configured to instruct the fan 60 to vary its speed to accommodate the amount of the plant materials to be transferred through the crop cleaning assembly 54. For example, when the monitored amount of plant materials increases, the control signals 218 may instruct the fan 60 to increase its speed to provide greater airflow to the sieves 58. Conversely, when the monitored amount of plant materials decreases, the control signals 218 may instruct the fan 60 to reduce its speed to provide reduced airflow to the sieves 58. However, it should be appreciated that, in alternative embodiments, the controller 210 may be configured to transmit control signals 218 to any other suitable component of the crop cleaning assembly 54 such that one or more operating parameters of the crop cleaning assembly 54 are adjusted to allow the monitored amount of plant materials to be transferred through the crop cleaning assembly 54.

Moreover, it should be appreciated that the controller 210 may be configured to adjust one or more operating parameters of any other suitable component of the plant processing system 32 based on the monitored amount of plant materials to process the estimated amount of plant materials being ingested by the header 100. For example, in one embodiment, the controller 210 may be configured to adjust one or more operating parameters of the elevator 66 based on the monitored amount of plant materials.

Additionally, in one embodiment, the controller 210 may be configured to create a plant yield map based on the amount of plant materials being ingested by the harvester 10. In general, the plant yield map may provide an indication of the amount of plant materials present at one or more geographical or physical location within the field. As such, the controller 210 may be configured to associate the estimated amount of plants materials being ingested by the harvester 10 with the current location or position of the harvester 10 (e.g., as determined by a GPS receiver or other location sensor (not shown)) within the field.

Figure 10:
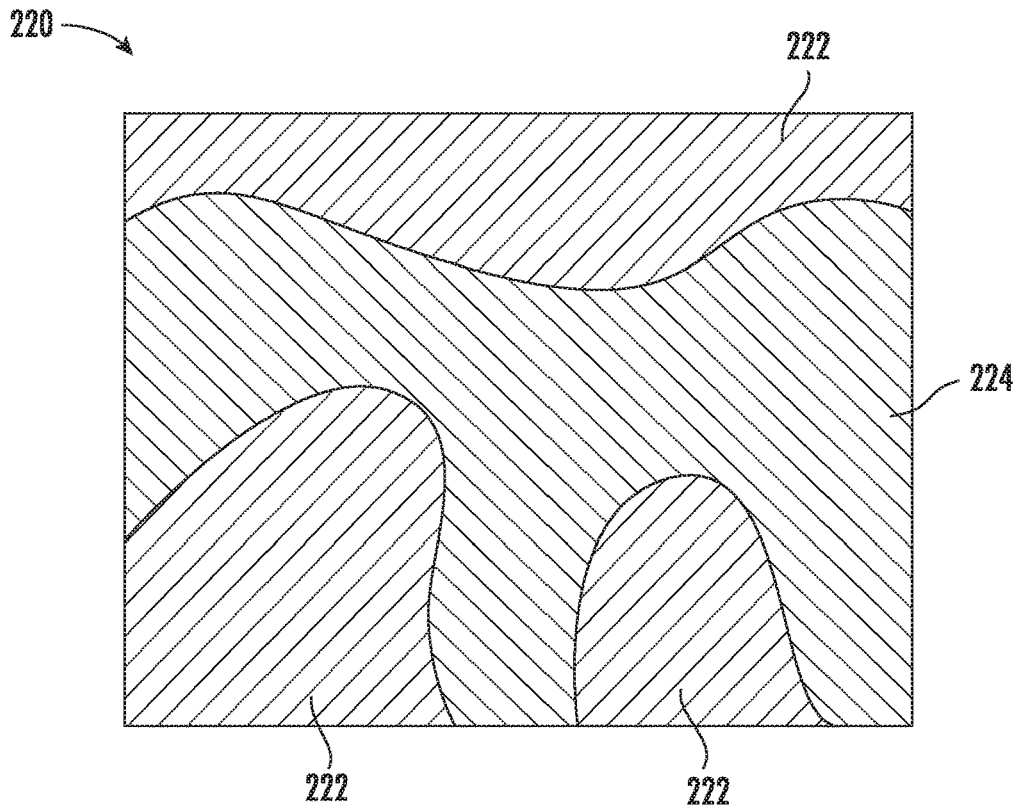
FIG. 10 illustrates an example field map in accordance with aspects of the present subject matter.

FIG. 10 illustrates an example plant yield map 220 illustrated in accordance with aspects of the present subject matter. As shown, the monitored amount of plant materials may vary at different locations within the field. For instance, in the example map 220 of FIG. 10, it may be assumed that regions 222 of the field have a greater monitored amount of plant materials than regions 224 of the field. As such, the regions 222, 224 may be depicted with different colors or other visual indicators indicative of their varying monitored amount of plant materials. For example, the regions 222 may be identified by dark green, while the regions 224 may be identified by light green. In this regard, it should be appreciated that the colors corresponding to the various monitored amounts of plant materials in the map 220 of FIG. 10 may be indicative of the monitored amount of plant materials associated with those particular quantities of standing crops 14. For example, in one embodiment, low amounts of plant materials may be associated with light green, and high amounts of plant materials may be associated with dark green.

Figure 11:
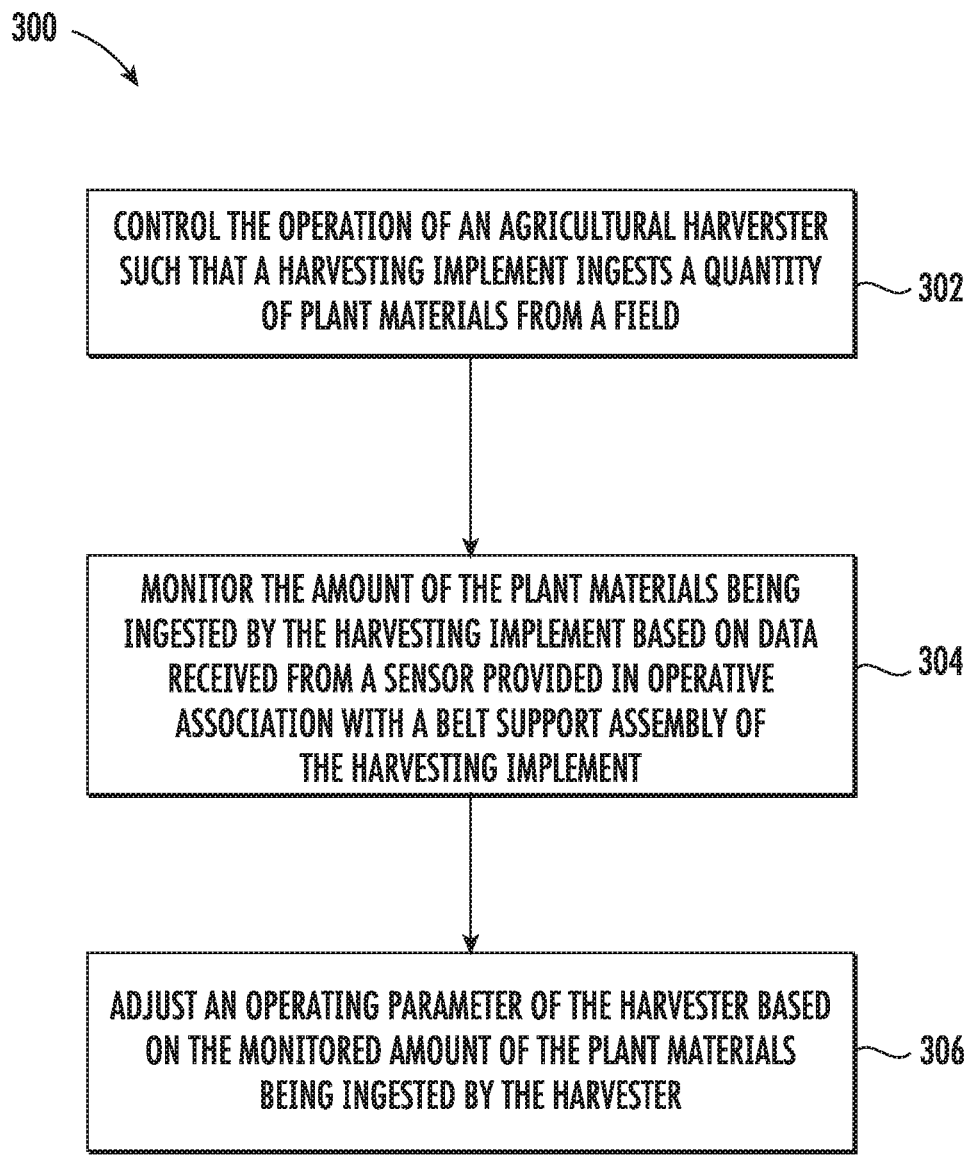
FIG. 11 illustrates a flow diagram of one embodiment of a system for monitoring the amount of crop materials entering an agricultural harvester in accordance with aspects of the present subject matter.

Referring now to FIG. 11, a flow diagram of one embodiment of a method 300 for monitoring the amount of plant materials entering an agricultural harvester is illustrated in accordance with aspects of the present subject matter. In general, the method 300 will be described herein with reference to the harvester 10, the header 100, and the system 200 described above with reference to FIGS. 1 through 10. However, it should be appreciated by those of ordinary skill in the art that the disclosed method 300 may generally be utilized to monitor the amount of plant materials entering a header of a harvester having any suitable harvester configuration and/or header configuration and/or in connection with any system of having any suitable system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (302), the method 300 may include controlling, with a computing device, an operation of the agricultural harvester such that the harvesting implement ingests a quantity of plant materials from a field. For instance, as described above, the harvester controller 210 may be configured to control the operation of the engine 40, the transmission 42, and the plant processing system 32 of the harvester 10 (e.g., via suitable control signals 218) such that the harvester 10 performs an operation (e.g., harvesting standing crop 14) as the harvester 10 is moved across the field in the direction of travel 12.

Additionally, at (304), the method 300 may include monitoring, with the computing device, an amount of the plant materials being ingested by the harvesting implement based on data received from a sensor provided in operative association with a belt support assembly of the harvesting implement. For instance, as described above, the harvester controller 210 may be communicatively coupled to the sensor(s) 202 (e.g., the load washer 204, the load pin 206, or the load cell 208) configured to capture data 216 indicative of the amount of plant materials currently being ingested by the harvester 10. As such, data 216 transmitted from the sensor 202 may be received by the harvester controller 210 and subsequently analyzed and/or processed to determine the amount of plant materials being ingested.

Moreover, as shown in FIG. 11, at (306), the method 300 may include adjusting, with the computing device, an operating parameter of the harvester based on the monitored amount of the plant materials being ingested by the harvester. As indicated above, the controller 210 may be configured to monitor the amount of plant materials to determine the quantity of the plant material being ingested by the harvester 10. In the event that the monitored amount of plant materials changes, the controller 210 may then implement a control action to adjust an operating parameter of the harvester 10 to permit the changed volume of the plant materials to be processed by the harvester 10. As described above, such control actions may, in several embodiments, include controlling one or more components of the harvester 10. For instance, the controller 210 may, in one embodiment, be configured to control the transmission 38 of the harvester 10 to increase or decrease the speed at which the harvester 10 is moved relative to the field. The controller 210 may also be configured to control the engine 36 of the harvester 10 to increase or decrease the power produced by the harvester 10. Furthermore, the controller 210 may be configured to adjust one or more operating parameters of the header 100 of the harvester 10, such as the height of the header 100 relative to the ground 26. Additionally, the controller 210 may be configured to adjust one or more operating parameters of the plant processing system 32 of the harvester 10, such as the speed of the feeder conveyor 50, the rotational speed of the rotor 18 of the threshing and separating assembly 46, and/or the speed of the fan 60 of the crop cleaning assembly 54.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural harvester, comprising:
a harvesting implement configured to ingest a quantity of plant materials from a field, the harvesting implement comprising:
a frame;
a conveyor belt configured to transport the quantity of plant materials through a portion of the harvesting implement;
a plurality of rollers configured to rotatably support the conveyor belt relative to the frame; and
a belt support assembly coupled to the frame between an adjacent pair of rollers of the plurality of rollers, the belt support assembly configured to support the conveyor belt as the conveyor belt moves relative to the belt support assembly, the belt support assembly comprising a first support member coupled to the frame and a second support member coupled to the first support member, the second support member configured to support the conveyor belt as the conveyor belt moves relative to the belt support assembly;
a sensor provided in operative association the belt support assembly, the sensor configured to detect a parameter indicative of a force exerted on the belt support assembly as the conveyor belt moves relative to the belt support assembly, the sensor positioned between the first and second support members; and
a controller communicatively coupled to the sensor, the controller configured to monitor an amount of the plant materials entering the harvester based on measurement signals received from the sensor.

2. The agricultural harvester of claim 1, wherein the first support member is oriented perpendicular to a direction of travel of the conveyor belt and the second support member is oriented parallel to the direction of travel of the conveyor belt.

3. The agricultural harvester of claim 1, wherein the first and second support members are coupled by a pin such that a shear force is applied to the pin when the conveyer belt move relative to the second member.

4. The agricultural harvester of claim 1, wherein the sensor is compressed by the first and second support members when the conveyer belt moves relative to the second member.

5. The agricultural harvester of claim 1, wherein the sensor comprises at least one of a load pin or a load washer.

6. The agricultural harvester of claim 1, wherein the controller is further configured to adjust an operating parameter of the harvester based on the monitored amount of plant materials being ingested by the harvester.

7. The agricultural harvester of claim 6, wherein the operating parameter corresponds to a speed at which the harvester is traveling across the field.

8. The agricultural harvester of claim 6, wherein the operating parameter corresponds to a height of the header relative to a ground surface of the field.

9. The agricultural harvester of claim 1, wherein the harvester further comprises a plant processing system configured to process the plant materials ingested by the harvester, the controller further configured to adjust an operating parameter of the plant processing system based on the monitored amount of plant materials being ingested by the harvester.

10. The agricultural harvester of claim 1, wherein the controller is further configured to create a plant yield map based on the monitored amount of plant materials being ingested by the harvester.

11. The agricultural harvester of claim 1, further comprising:
a feeder, wherein the harvesting implement is coupled to the feeder, the feeder configured to receive the quantity of plant materials from the harvesting implement.

12. A system for monitoring an amount of plant materials entering an agricultural harvester, the system comprising:
a harvesting implement configured to ingest a quantity of plant materials from a field, the harvesting implement comprising:
a frame;
a conveyor belt configured to transport the quantity of plant materials through a portion of the harvesting implement;
a plurality of rollers configured to rotatably support the conveyor belt relative to the frame; and
a belt support assembly coupled to the frame between an adjacent pair of rollers of the plurality of rollers, the belt support assembly configured to support the conveyor belt as the conveyor belt moves relative to the belt support assembly, the belt support assembly comprising a first support member coupled to the frame and a second support member coupled to the first support member, the second support member configured to support the conveyor belt as the conveyor belt moves relative to the belt support assembly;
a sensor provided in operative association the belt support assembly, the sensor configured to detect a parameter indicative of a force exerted on the belt support assembly as the conveyor belt moves relative to the belt support assembly, the sensor positioned between the first and second support members; and
a controller communicatively coupled to the sensor, the controller configured to monitor the amount of the plant materials entering the harvester based on measurement signals received from the sensor.

13. The system of claim 12, wherein the first support member is oriented perpendicular to a direction of travel of the conveyor belt and the second support member is oriented parallel to the direction of travel of the conveyor belt.

14. The system of claim 12, wherein the first and second support members are coupled by a pin such that a shear force is applied to the pin when the conveyer belt move relative to the second member.

15. The system of claim 12, wherein the sensor is compressed by the first and second support members when the conveyer belt moves relative to the second member.

16. The system of claim 12, wherein the sensor comprises at least one of a load pin or a load washer.

17. An agricultural harvester, comprising:
a harvesting implement configured to ingest a quantity of plant materials from a field, the harvesting implement comprising:
a frame;
a conveyor belt configured to transport the quantity of plant materials through a portion of the harvesting implement;
a plurality of rollers configured to rotatably support the conveyor belt relative to the frame; and
a belt support assembly coupled to the frame between an adjacent pair of rollers of the plurality of rollers, the belt support assembly configured to support the conveyor belt as the conveyor belt moves relative to the belt support assembly;
a sensor provided in operative association the belt support assembly, the sensor configured to detect a parameter indicative of a force exerted on the belt support assembly as the conveyor belt moves relative to the belt support assembly; and
a controller communicatively coupled to the sensor, the controller configured to:
monitor the amount of the plant materials entering the harvester based on measurement signals received from the sensor; and
create a plant yield map based on the monitored amount of plant materials being ingested by the harvester.

18. The agricultural harvester of claim 17, wherein the belt support assembly comprises a first support member coupled to the frame and a second support member coupled to the first support member, the second support member configured to support the conveyor belt as the conveyor belt moves relative to the belt support assembly, the sensor positioned between the first and second support members.

19. The agricultural harvester of claim 17, wherein the sensor comprises at least one of a load pin or a load washer.

20. The agricultural harvester of claim 17, wherein the controller is further configured to adjust an operating parameter of the harvester based on the monitored amount of plant materials being ingested by the harvester.

* * * * *